Dec. 15, 1931.   J. A. HEIDEN   1,837,043
UNIVERSAL ANTIFRICTION JOINT
Filed Feb. 14, 1930   2 Sheets-Sheet 1
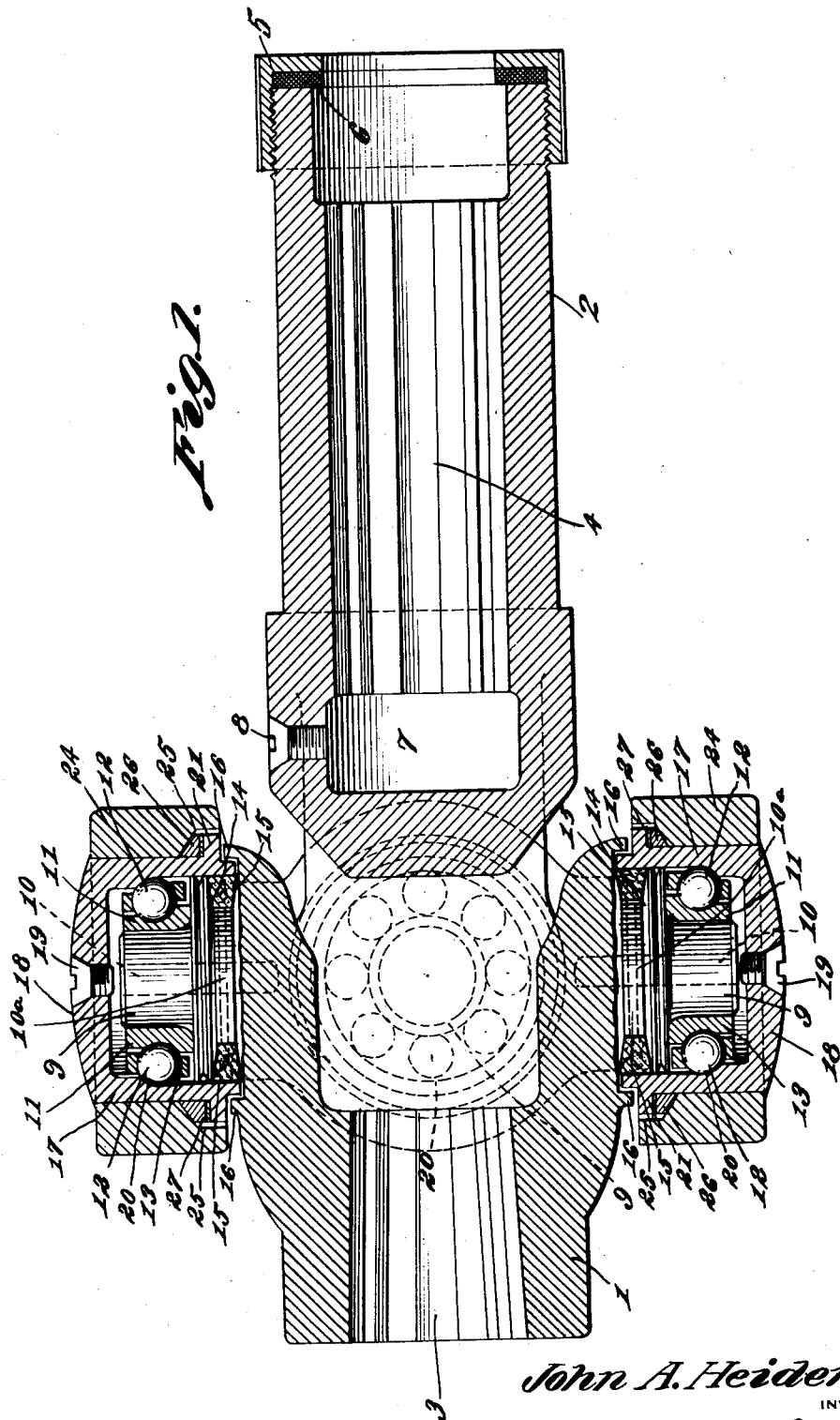

Dec. 15, 1931.  J. A. HEIDEN  1,837,043
UNIVERSAL ANTIFRICTION JOINT
Filed Feb. 14, 1930  2 Sheets-Sheet 2
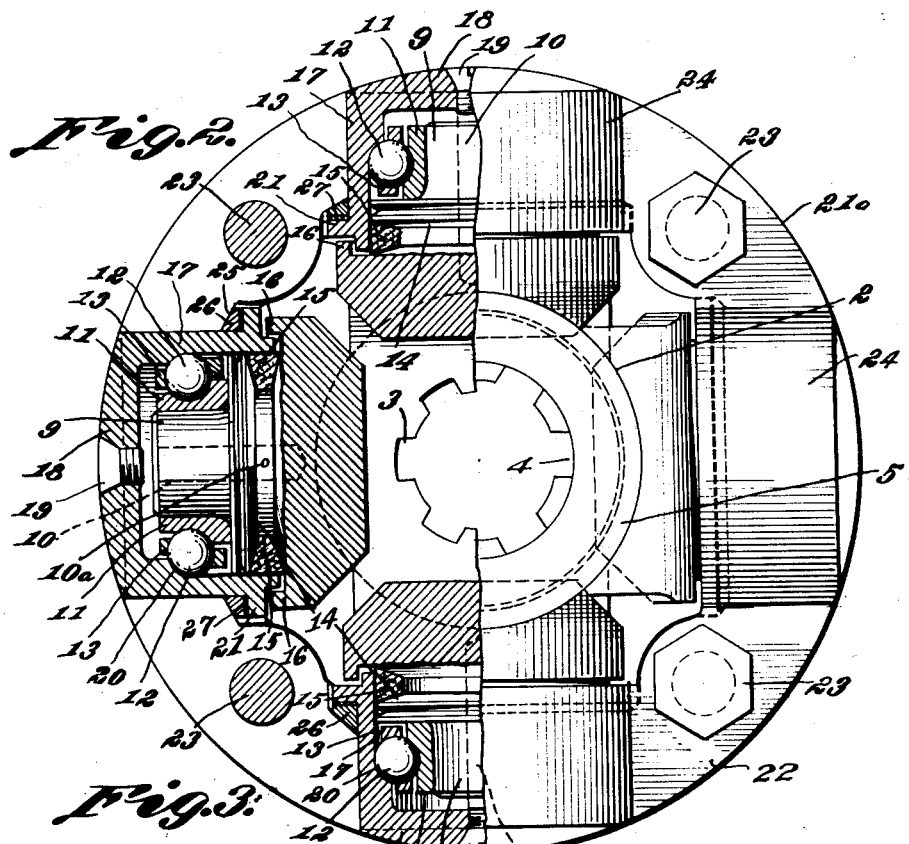
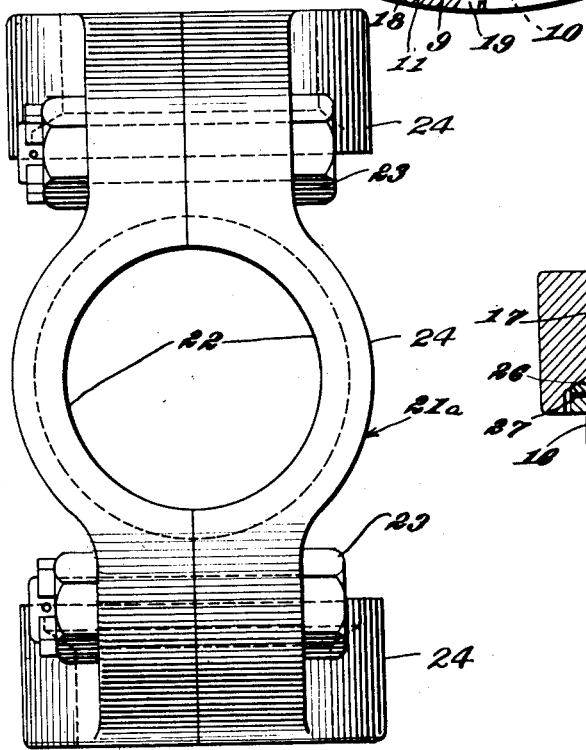
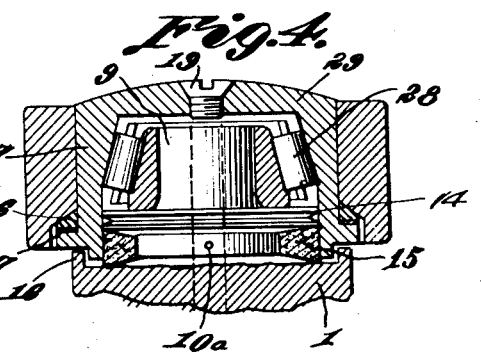
John A. Heiden,
INVENTOR
BY Victor J. Evans
ATTORNEY
WITNESS: William Thompson Patented Dec. 15, 1931

1,837,043

UNITED STATES PATENT OFFICE

JOHN A. HEIDEN, OF PITTSBURGH, PENNSYLVANIA

UNIVERSAL ANTIFRICTION JOINT

Application filed February 14, 1930. Serial No. 428,480.

This invention relates to new and useful improvements in universal anti-friction joints and has for its primary object the provision of means for connecting rotating shafts or the like, to permit one shaft to turn the other shaft independent of various changes of angles of one shaft with respect to the other end with the angular misalignment kept in predetermined limits.

Another object of this invention is the provision of means for reducing friction between various movable parts to a minimum, thereby provide a device with a high degree of efficiency and capable of operation at very high speeds.

A further object of this invention is the provision of means whereby the anti-friction devices may be easily and quickly assembled and efficiently lubricated and protected from dirt and other foreign matter.

A still further object of this invention is to provide a universal anti-friction joint of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a longitudinal sectional view illustrating a universal anti-friction joint construction in accordance with my invention.

Figure 2 is a transverse sectional view illustrating the same.

Figure 3 is a detail view illustrating the clamping rings.

Figure 4 is a detail sectional view illustrating the use of an anti-friction roller bearing.

Referring in detail to the drawings the reference numerals 1 and 2 indicate socket members and the member 1 is provided with a tapered boss 3 having a plurality of grooves to receive the splined and tapered end of a shaft. The member 2 is provided with a straight bore 4, the walls of which are grooved to slidably receive the splined straight end of a second shaft. The free end of the member 2 is screw threaded to receive a stuffing collar 5 having interposed between itself and the end of the member 2 a packing ring 6 adapted to establish a leak-proof connection between the second shaft and the member 2. The second shaft is capable of endwise movement in the member 2 for compensating for the endwise movement of the shafts with respect to each other. The inner end of the bore 4 is enlarged to form an oil chamber 7 adapted to be filled with a suitable lubricant by the removal of the screw plug 8 consequently furnishing the second shaft with sufficient lubricant at all times to permit the same to slide freely within the member 2.

Radially extending trunnions 9 are formed on the members 1 and 2 and have formed therein oil reservoirs 10 with air escape holes 10a near to the inner ends thereof. The reservoirs open outwardly through the outer ends of said trunnions and the latter have mounted thereon inner races 11 receiving anti-friction balls 12 carried in cages 13. The inner races 11 are limited inwardly on the trunnions 9 by stop collars 14 resting upon packing rings 15 disposed against the member 1. The stop collars 14 are provided with grease grooves in the peripheries thereof as clearly shown in Figure 1 of the drawings. Outwardly extending annular flanges 16 are formed on the members 1 and 2 and receive the inner ends of caps 17 which have their outer ends enclosed by integral walls 18 provided with oil passages in alignment with the oil passages or reservoirs 10 and normally closed by screw threaded plugs 19 which will permit when removed lubricant to be easily placed within the caps 17 and oil passages or chambers 10. The caps 17 are provided with annular grooves 20 on their inner faces to receive the balls 12 forming an outer race for the ball bearings. Annular flanges 21 are formed on the inner ends of the caps 17 and overlie the flanges 16 as clearly shown in Figure 1.

A clamping member 21a comprises a pair of sections 22 that are detachably secured together by bolts 23 and the member 21a has radially disposed socket members 24 spaced 90 degrees to receive the caps or housings 17 as clearly shown in Figure 1 of the drawings and the inner walls adjacent the inner ends are recessed as at 25 to engage conical shaped walls of the rings 26. The rings 26 have straight inner walls abutting against shims 27 that rest upon the flanges 21 so as to adjust the running clearance for the balls 12 in the caps or housings 17.

If desired roller bearings 28 may be used in lieu of the ball bearings 12 as clearly shown in Figure 4. The cap or housing 29 in this form having its inner wall inclined to form a proper bearing surface for the rollers 28 thus it will be seen that my invention permits the use of either ball bearings or roller bearings and is of a very compact nature comprising a few parts and that all of the movable parts will be efficiently lubricated. The lubricant in the bores or chambers 10 will be thrown therefrom by centrifugal force consequently lubricating the bearings and their races and the grease collars 14 and packing rings 15 will prevent the escape of lubricant when the device is standing idle.

While I have shown and described the preferred embodiment of my invention, it will be understood that minor changes in construction, combination and arrangement of parts may be made without departing from the spirit and scope of the invention as claimed.

Having thus described my invention, what I claim is:

A universal joint comprising shaft receiving members, trunnions formed on the members, bearings carried by said trunnions, housings receiving said bearings and trunnions and having their outer ends closed and spaced from the outer ends of the trunnions, said trunnions having lubricant reservoirs extending outwardly through their ends, means for permitting the lubricant to be placed in the housings and reservoirs, stop collars having grooved peripheries carried by the trunnions and engaging the bearings and housings, packing between the collars and shaft members, flanges on the members and receiving the housings, and a connecting means to receive the housings.

In testimony whereof I affix my signature.

JOHN A. HEIDEN.